(No Model.)

C. H. SHEPARD.
BRIDLE BIT.

No. 506,834. Patented Oct. 17, 1893.

WITNESSES,
P. E. Stevens
M. C. Hillyard

INVENTOR.
Charles H. Shepard.
By W. E. Stevens, Atty.

UNITED STATES PATENT OFFICE.

CHARLES HENRY SHEPARD, OF NORTH PLAINFIELD, NEW JERSEY.

BRIDLE-BIT.

SPECIFICATION forming part of Letters Patent No. 506,834, dated October 17, 1893.

Application filed February 11, 1886. Serial No. 191,558. (No model.)

*To all whom it may concern:*

Be it known that I, CHARLES HENRY SHEPARD, a citizen of the United States, and a resident of North Plainfield, in the county of Somerset and State of New Jersey, have invented a new and valuable Improvement in Bridle-Bits; and I do declare that the following is a full, clear, and exact description of the construction and operation of the same, reference being had to the drawings making a part of this specification.

My invention relates to an improvement in bits for the control of horses and mules without injury to their mouths.

The object of my invention is to obtain a leverage, purchase or bearing on the roof of the mouth of the horse or mule connected with a check-rein which will prevent the animal from an undue lugging or bearing on the check-rein and that when used at the same time with any ordinary riding or driving bit and ordinary ring martingale will enable the rider or driver to obtain perfect control of the animal without extraordinary exertion and without possible injury to its mouth.

To this end my invention consists in the construction and arrangement of parts forming a bit for horses, hereinafter described and claimed, reference being had to the accompanying drawings, in which—

Figure 1:
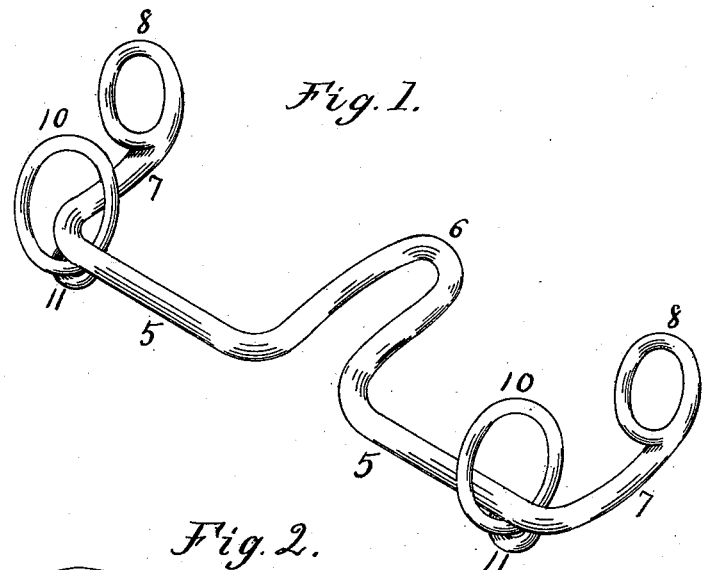
Figure 2:
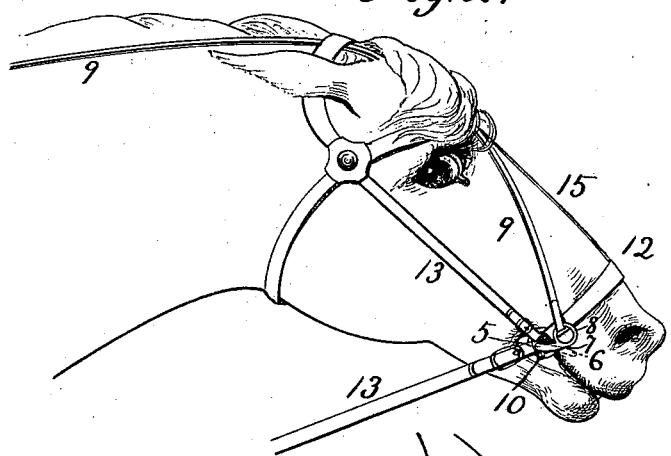
Figure 3:
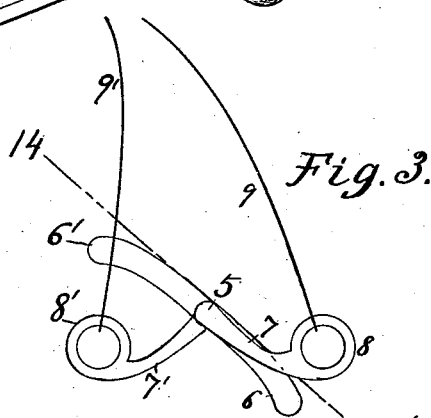

Figure 1, is a perspective view of a bit according to my invention. Fig. 2, is a side view of a horse's head showing my bit in service. Fig. 3, is a diagram to illustrate the principle of operation.

5 represents the cross-bar or rockshaft of a bit, provided with an off-set or arm 6 to be located centrally within the horse's mouth to press against the roof thereof while in service, and this arm may project either backward or forward from the rockshaft 5.

7 represents a pair of levers extending from the cross-bar at the sides of the month, in the same direction with the arm 6, and provided with loops 8 at their ends to which the two branches of an ordinary check-rein 9 are to be attached in service.

10 represents a pair of rings passing around the rockshaft 5 as a bearing therefor, and prevented from sliding lengthwise thereon by means of staples 11, which are either made integral with or firmly secured to the rockshaft.

Into the rings 10 the nose-band 12 is to be attached so closely as to hold the rockshaft 5 comfortably against the roof of the horse's mouth. The first movement of the horse in attempting to run away or to control matters for himself is to throw his nose down and stretch his neck forward. With this overcheck bit whenever the horse attempts such a movement, the check-line 9 being hitched in the usual manner to the saddle upon the horse's body, pulls backward and upward upon the levers 7 and turns the bit upon its rockshaft 5, which, mechanically speaking, has journal bearings in the rings 10, thus forcing the arm 6 against the roof of the horse's mouth and causing him to punish himself. The roof of the mouth being somewhat tender to such pressure adds still farther to the horse's discomfort and a horse will quickly learn to adapt himself to such conditions as tend to his comfort so that very few horses, no matter how headstrong they are, will ever try more than once or twice to pull against this over-check bit. It will be seen that the action of this bit is wholly independent of the usual guiding lines, whether the same are used for saddle or carriage riding. I use this bit preferably in the manner already described in company with another entirely independent bit for driving and guiding the horse, but yet whenever it is desirable to use only one bit the guiding lines may be attached to the rings 10 as shown at 13, in which case there is very little action to tip the bit by the act of driving, and there is no tendency whatever under any circumstances to press the arm 6 downward upon the horse's tongue.

I have here shown the arm 6 extending forward in the mouth but in many cases it is better that the arm should extend backward from the rockshaft 5, yet in either case the lever 7 should extend practically from the same side of the rockshaft or fulcrum as the arm 6 does.

The diagram shown in Fig. 3, illustrates both methods of using this bit, numbers corresponding to those already used being placed on that side of the diagram in which the arm 6 extends forward as shown in Figs. 1 and 2, and similar prime numbers indicating the same corresponding parts are used on that side where the arm extends rearward from the rockshaft 5. It will here be seen that owing to the natural slant of the roof of the horse's mouth, as indicated by the broken line 14, it becomes necessary for the lever 7' to form something of an angle with the arm 6' in order that the check-rein 9' when attached to the loop 8' shall pull at the same side of the cross-bar 5 as the arm 6' extends.

Mechanically considered the principal feature of difference between this bit and the old style of bits is that the cross-bar 5 is, in action, a rockshaft bearing on a fulcrum which is supported entirely by the nose-band and the check line is attached to the lever 7, while it is common to attach guiding lines to the lever portion.

I am aware that bits have before been hung upon the nose-band as a fulcrum but in such cases the portion of the bit corresponding to my arm 6 was adapted to press against the tongue or lower jaw while mine presses against the roof of the mouth or upper jaw, and in those cases the reins or guiding lines were attached to the lever at that side to pull directly upon the horse's tongue and the check-rein was not attached to any lever at all. The nose-band should be supported in position in any usual manner, as by strap 15 extending to a head piece.

By the use of my bit a careless or cruel driver cannot punish the horse, as he can do with bits in which the guiding lines are attached to powerful levers, and at the same time any unruly action of the horse which leads him to stretch out his neck is checked by his own effort, so that unruly horses are quickly made docile by means of this check bit.

Having thus fully described my invention, what I believe to be new, and desire to secure by Letters Patent, is the following:

1. A bridle-bit having a mouth-bar provided with a central projection or gag, and with end projections or levers all at the same side of the bar, rings for the over-draw check at the ends of the levers and projecting at that side of the levers to raise the gag by rolling the mouth-bar, and rings on the mouth-bar for the nose-strap, substantially as described.

2. A bridle bit having a mouth-bar provided with a central projection or gag and with projections or levers all at the same side of the bar, rings for the over-draw check at the ends of the levers and projecting at the side of the levers to raise the gag by rolling the mouth-bar, staples at the ends of the bar and rings around the bar within the staples, for the nose-strap, substantially as described.

Signed at North Plainfield, in the county of Somerset and State of New Jersey, this 4th day of February, A. D. 1886.

CHAS. HENRY SHEPARD.

Witnesses:
ELIAS R. POPE,
JAMES C. POPE.